United States Patent [19]
Kishi et al.

[11] Patent Number: 4,533,286
[45] Date of Patent: Aug. 6, 1985

[54] TOOL COMPENSATION METHOD

[75] Inventors: Hajimu Kishi, Hino; Masaki Seki, Suginami; Masashi Kawasumi, Hino, all of Japan

[73] Assignee: Fanuc Ltd., Minamitsuru, Japan

[21] Appl. No.: 444,592

[22] PCT Filed: Mar. 30, 1982

[86] PCT No.: PCT/JP82/00085
§ 371 Date: Nov. 17, 1982
§ 102(e) Date: Nov. 17, 1982

[87] PCT Pub. No.: WO82/03473
PCT Pub. Date: Oct. 14, 1982

[30] Foreign Application Priority Data

Mar. 30, 1981 [JP] Japan .................. 56-047048

[51] Int. Cl.$^3$ .................. B23G 1/00
[52] U.S. Cl. .................. 409/80; 318/572; 364/474; 409/84; 409/131
[58] Field of Search .................. 409/80, 84, 79, 131, 409/132, 125, 126, 120, 119, 95; 51/326, 287; 318/572, 632; 364/474, 520, 170

[56] References Cited

U.S. PATENT DOCUMENTS

| | | | |
|---|---|---|---|
| 2,480,807 | 8/1949 | Vlieg | 409/84 |
| 3,073,998 | 1/1963 | Bower | 409/80 X |
| 3,148,317 | 9/1964 | Tripp | 409/80 X |
| 3,430,035 | 2/1969 | Read | 409/80 |
| 4,176,992 | 12/1979 | Ross et al. | 409/131 |

FOREIGN PATENT DOCUMENTS

| | | | |
|---|---|---|---|
| 49-26549 | 7/1974 | Japan | 409/80 |
| 0219993 | 7/1977 | U.S.S.R. | 409/80 |

Primary Examiner—William R. Briggs
Assistant Examiner—Glenn L. Webb
Attorney, Agent, or Firm—Staas & Halsey

[57] ABSTRACT

A tool compensation method for cutting a surface on a workpiece having a slanted surface. A radius at a final point is determined by a path computing unit using coordinates of the final cutting point and a tool height. Based on these values thus determined, coordinates of a final offset position, which is aligned with a tool center, is also computed. Corrective values in the directions of the X and Y axes are determined using the computed coordinates and coordinates of a starting offset position, to thereby correct the movement of the tool center.

6 Claims, 12 Drawing Figures

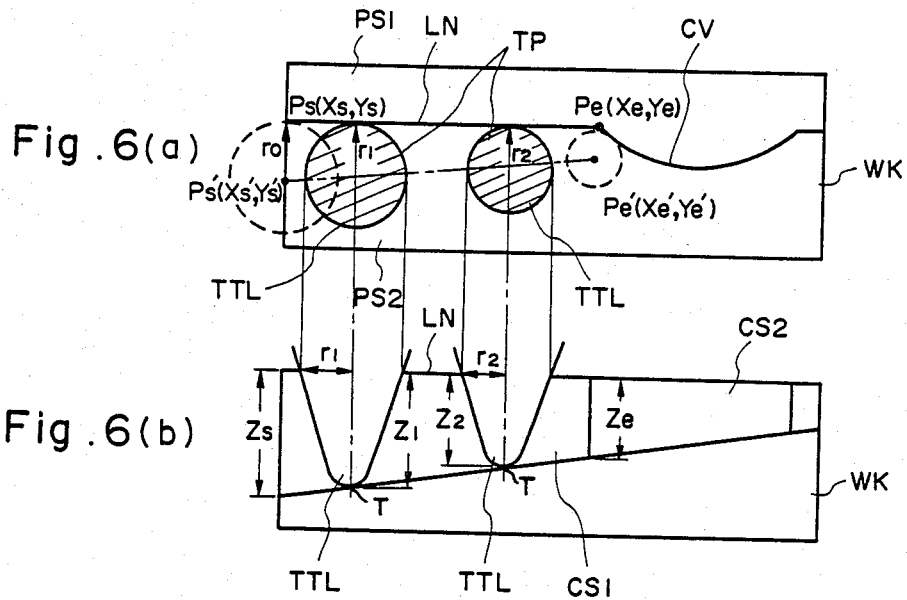
Fig. 6(a)
Fig. 6(b)
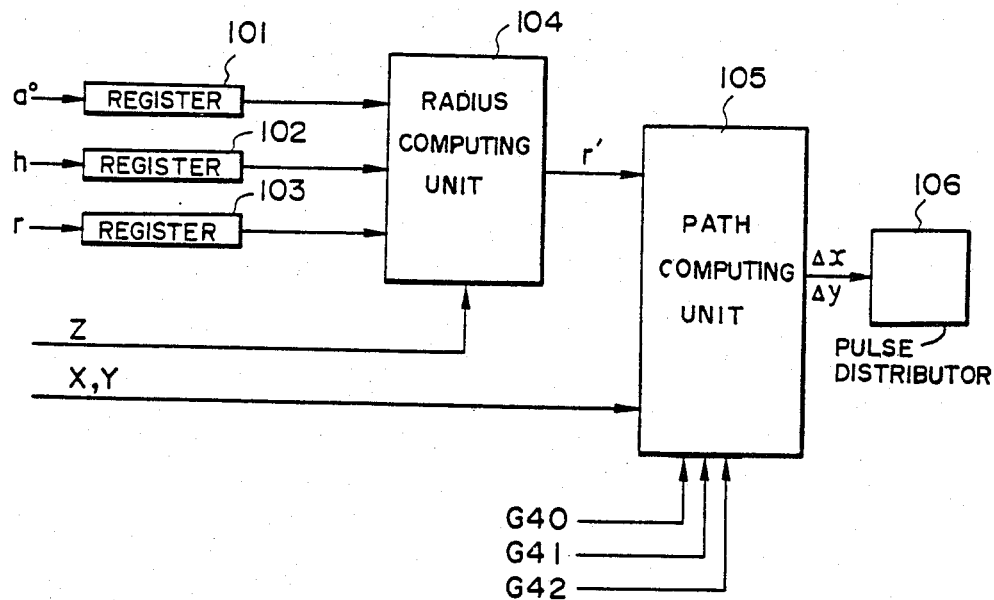
Fig. 7

TOOL COMPENSATION METHOD

BACKGROUND OF THE INVENTION

The present invention relates to a tool compensation method and, more particularly, to a tool compensation method suitable for applications in which a workpiece is cut by a tapered tool.

Numerical control (NC) systems usually have a tool compensation function. Tool compensation corrects a cutting error due to a tool radius by defining as the passage of movement of a tool center a path that is displaced a distance equal to the tool radius rightward or leftward from a programmed path.

Assuming that there are two programmed paths defined along straight lines $L_1$, $L_2$ extending at an angle $\alpha$ ranging from 90° to 180° as shown in FIG. 1(a), the process of tool compensation is carried out as follows: A movement command for a current block $b_1$ and a movement command for a next block $b_2$ are read in advance, and straight lines $L_1'$, $L_2'$ are determined which are offset a tool radius $r_1$ from straight lines $L_1$, $L_2$, respectively, in the current block $b_1$ and the next block $b_2$. The coordinates of a point $S_1$ where the straight lines $L_1'$, $L_2'$ intersect are then computed. By moving the tool from a final point $S_0$ in a previous block to the point $S_1$ through pulse distribution, the center of the tool follows a passage that is offset a distance equal to the radius $r_1$ from the properly commanded programmed path for thereby cutting the workpiece. FIG. 1(b) is illustrative of a process of tool compensation performed when the angle $\alpha$ is smaller than 90°.

Where NC systems have such a tool compensation function, programming is quite simple as it is not necessary to take into account the tool radius in preparing an NC data tape. When the tool radius varies due to wear or use of a different tool, the workpiece can be cut correctly by using a tool radius setting dial on an NC system panel to make a tool radius setting, or supplying a tool radius input through an MDI (manual data input) terminal.

However, the above discussed tool compensation method is applicable only to cutting operations using tools having a radius r constant in the axial direction as shown in FIGS. 2(a) through 2(c). As illustrated in FIG. 3, when a tool TL having a radius r is moved in the direction of the arrow A along a straight line LN and a curved line CV to cut surfaces $CS_1$, $CS_2$, a workpiece WK can be cut to a desired contour simply by offsetting the tool center a distance equal to the radius r from the straight line LN and the curved line CN even if the workpiece WK has nonparallel surfaces $PS_1$, $PS_2$. With the tool TL having the constant radius r, therefore, the distance by which the tool center is offset can be kept constant at all times irrespective of the depth by which the tool cuts into the workpiece, or even when the upper and lower workpiece surfaces $PS_1$, $PS_2$ do not lie parallel to each other.

Numerical control has found increasing use recently for cutting three-dimensional shapes, particularly dies. Tapered tools TTL having tapers TP, as shown in FIGS. 4(a) and 4(b), are used more frequently for cutting dies. Such tapered tools caused no problem as long as they cut workpieces with their tips. However, when their tapered surfaces are employed to form workpiece profiles, the tapered tools are unable to effect correct cutting under the conventional tool compensation control method since the tool radius varies in the axial direction.

SUMMARY OF THE INVENTION

It is accordingly an object of the present invention to provide a tool compensation method capable of precisely cutting a workpiece with a tapered tool under the control of a command. When a workpiece is cut by a tapered tool, data for defining the inclination of a taper of the tapered tool and data on a radius of the tool at a given height thereof are set in a register, and these data items and profile data are processed by a passage computing unit to determine an offset value, based on which the tool is offset for cutting the workpiece.

BRIEF DESCRIPTION OF THE DRAWINGS

FIGS. 6(a) and (b) illustrate a preferred embodiment of the tool compensation method of the present invention; and FIG. 7 is a block diagram of a preferred embodiment for effecting the method of the present invention.

DETAILED DESCRIPTION OF THE PREFERRED EMBODIMENTS

Figure 1A:
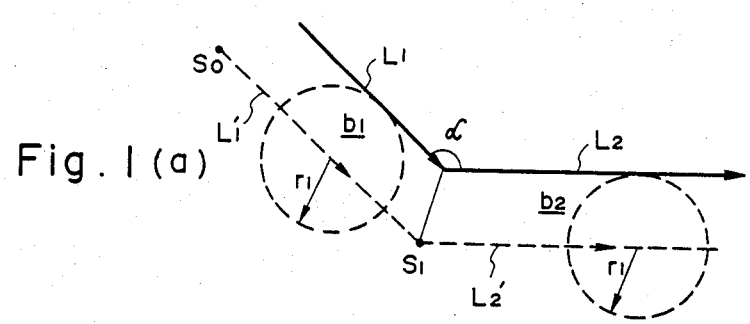
FIGS. 1(a) and (b) illustrate conventional tool compensation methods.
Figure 1B:
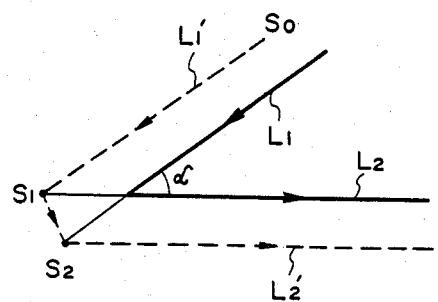

The present invention will hereinafter be described in more detail with reference to a preferred embodiment thereof shown in the drawings.

Figure 5:
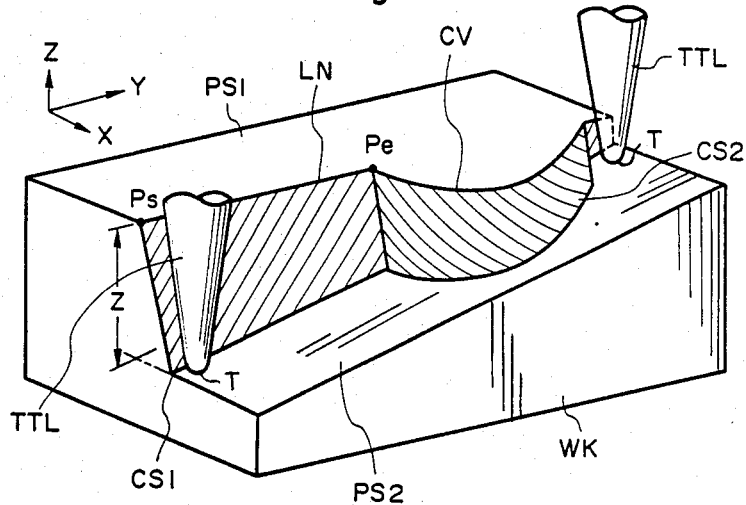
FIG. 5 is a perspective view of a workpiece as it is cut by a tapered tool.

FIG. 5 illustrates the reason the conventional tool compensation method cannot be relied on for cutting a workpiece with a tapered tool. Parts which are identical in FIGS. 5 and 3 are denoted by identical reference characters. The tapered tool used is the same as the one shown in FIG. 4(a).

The tapered tool TTL is moved along the straight line LN to cut the workpiece WK with the tool tip T held against the lower workpiece surface $PS_2$. Inasmuch as the upper workpiece surface $PS_1$ of the workpiece WK does not lie parallel to the lower surface $PS_2$ thereof, the height Z from the lower surface or tip T of the tool to the upper surface, or the depth by which the tool cuts into the workpiece, varies as the cutting progresses. When the amount of offsetting of the tool is equal to the initial tool radius at all times, the tool cuts at a short depth while the cutting advances, thus failing to cut the workpiece correctly. Therefore, it is necessary to change the tool radius as the cutting continues for tool compensation.

Figures 2A, 2B, 2C, 4A, 4B:
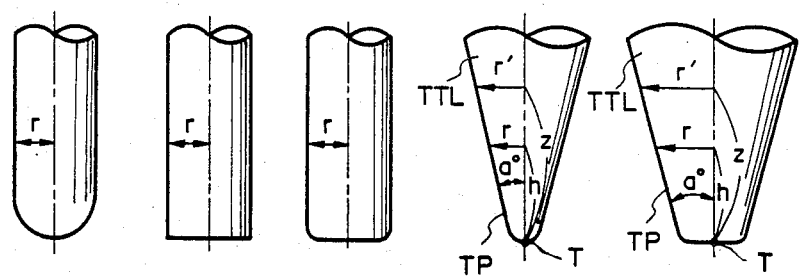
FIGS. 2(a)-(c) are elevational views of tools having constant radii.
FIGS. 4(a) and (b) are elevational views of tapered tools.
Figure 3:
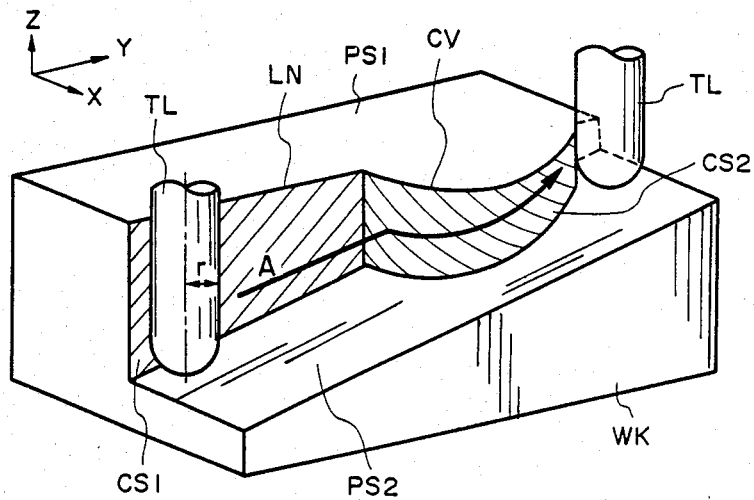
FIG. 3 is a perspective view of a workpiece as it is cut by a tool having a constant radius.

According to the present invention, a tool radius r at a distance h from the tool tip T and a half taper angle a° as shown in FIG. 4(a) are set or supplied as inputs, and a tool radius r′ is determined by the following equation dependent on the height Z (FIG. 5) as separately supplied as an input or computed:

$$r' = r + (Z - h)\tan a° \qquad (1).$$

Tool compensation is carried out on the basis of the tool radius r′ thus determined.

With the above method, the workpiece cutting progresses while the taper TP of the tapered tool TTL is in contact with the straight line LN at all times as illustrated in FIGS. 6(a) and (b). FIG. 6(a) is a horizontal cross-sectional view of the tapered tool TTL taken along a plane containing the upper workpiece surface PS₁ (FIG. 5), and FIG. 6(b) is a side elevational view of the tool.

FIG. 7 is a block diagram of a preferred embodiment for carrying out the method of the present invention. Designated at 101, 102, 103 are registers for storing a taper angle a°, a height h as measured from the tool tip T, and a radius r at the height h, respectively, which are supplied as an input through an MDI terminal or set by a dial on the panel. A radius computing unit 104 performs the arithmetic operation as defined by the equation (1) and produces as an output a radius r' which varies from time to time dependent on the height Z (the depth by which the tool cuts into the workpiece). A path computing unit 105 computes and delivers as output coordinates Xe' and Ye' an offset position Pe' at a final point Pe (FIG. 6(a)) on the straight line LN having X-Y coordinates (Xe, Ye), and also computes the difference between the offset position Pe' and a starting offset position Ps' (Xs', Ys'). The path computing unit 105 is supplied with G codes indicative of a leftward offset (G41) with respect to the direction of advancing movement, a rightward offset (G42), or an offset cancel (G40), and also with the X-Y coordinates (Xe, Ye) of the final point Pe of the straight line LN. The path computing unit 105 computes the coordinates (Xe', Ye') of the offset position Pe' at the final point dependent on the G code, and then computes incremental values $\Delta x$, $\Delta y$ from the starting offset position to the final offset position based on the computed coordinates and the coordinates (Xs', Ys') of the starting offset position Ps' which are stored in a register (not shown). Designated at 106 is a known pulse distributor.

It is now assumed that an NC data tape supplies data on the coordinates (Xe, Ye) of the final point Pe on the straight line LN and a height Ze at the final point in order to cut a surface CS₁ (FIG. 5). The tapered tool TTL is located in dotted-line position as shown in FIG. 6(a), and the starting offset coordinates (Xs', Ys') are stored in the non-illustrated register in the path computing unit 105. The height Ze is a distance from the lower workpiece surface PS₂ to the upper workpiece surface PS₁ at the final point Pe.

When supplied with Xe, Ye, Z, the radius computing unit 104 determines a tool radius re at the final point Pe by way of the arithmetic operation according to the equation (1) using the taper angle a°, the distance h, the radius r and the height Ze stored in the registers 101 through 103, and delivers the determined tool radius to the path computing unit 105. The path computing unit 105 uses the supplied radius re and the coordinates (Xe, Ye) of the final point to compute the coordinates (Xe', Ye') of the final offset position Pe' in the same manner as the conventional tool compensation method, and delivers out the computed coordinates. Incremental values $\Delta x$, $\Delta y$ in the directions of the X and Y axes are determined by the following equations using the coordinates (Xs', Ys') of the starting offset position Ps' and the computed coordinates (Xe', Ye') of the final offset position Pe':

$$\Delta x = Xe' - Xs' \quad (2)$$

$$\Delta y = Ye' - Ys' \quad (3)$$

The incremental values are then supplied to the pulse distributor 106, which then causes the tool center to move along the dot-and-dash line illustrated in FIG. 6(a).

While in the foregoing description the data on the taper angle a° and the radius r (at the height h) are supplied as inputs through the MDI terminal or the dial, other data items than a°, r, h may be used provided they can determine a tool radius at a desired height.

INDUSTRIAL APPLICABILITY

The tool compensation method of the present invention enables a tapered tool to cut a workpiece simply and precisely under the control of a command, and facilitates programming.

Although the above description has been directed to cutting of the workpiece along the straight line LN, cutting along a curved line can also be performed using the linear cutting technique according to the present invention by incorporating a multiplicity of minute straight lines which approximate the curved line as a whole.

The present invention is also applicable to instances where an NC data tape is prepared by an automatic NC data tape generating apparatus.

What is claimed is:

1. A tool compensation method for offsetting a tapered tool by a distance corresponding to a tool radius from a commanded tool path for cutting a workpiece, wherein the tool path has a varied depth relative to a work surface, comprising the following steps:
    (a) storing data defining
        (i) the inclination a° of a uniform taper of the tapered tool, and
        (ii) a radius r of the tapered tool at a given height h above the tip of the tool;
    (b) determining an offset value based on said data defining the inclination, said radius, and height; and
    (c) offsetting the tool according to said offset value to cut the workpiece, thereby utilizing a corrected tool position dependent upon the depth of which the tool is infed.

2. A tool compensation method according to claim 1, wherein a tool radius r' at a position Z from the tip of the tool is computed by $$r' = r + (Z - h) \tan a =$$

and wherein the computed tool radius r' is employed as said offset value.

3. A tool compensation method according to claim 1, wherein the tool path is corrected by said offset value.

4. The tool compensation method according to claim 1, wherein the data is stored in a plurality of registers.

5. The tool compensation method according to claim 2, wherein the data is stored in a plurality of registers.

6. The tool compensation method according to claim 3, wherein the data is stored in a plurality of registers.

* * * * *

UNITED STATES PATENT AND TRADEMARK OFFICE
CERTIFICATE OF CORRECTION

PATENT NO. : 4,533,286

DATED : Aug. 6, 1985

INVENTOR(S) : Kishi et al.

It is certified that error appears in the above-identified patent and that said Letters Patent is hereby corrected as shown below:

<u>Col. 4</u>

Line 54, "tan a =" should read --tan a°--.

Signed and Sealed this

Fifteenth Day of October 1985

[SEAL]

Attest:

DONALD J. QUIGG

Attesting Officer

Commissioner of Patents and Trademarks—Designate